United States Patent
Wang et al.

(10) Patent No.: US 11,854,282 B2
(45) Date of Patent: Dec. 26, 2023

(54) METHOD FOR CORRECTING OPTICAL CHARACTER RECOGNITION TEXT POSITION, STORAGE MEDIUM AND ELECTRONIC DEVICE

(71) Applicant: BOE Technology Group Co., Ltd., Beijing (CN)

(72) Inventors: Chuan Wang, Beijing (CN); Xinyu Miao, Beijing (CN); Xiaohong Wei, Beijing (CN); Nan Liu, Beijing (CN); Yongyang Yan, Beijing (CN); Yunan Wang, Beijing (CN); Hong Wang, Beijing (CN); Yiming Lei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 216 days.

(21) Appl. No.: 17/357,927

(22) Filed: Jun. 24, 2021

(65) Prior Publication Data
US 2022/0076043 A1   Mar. 10, 2022

(30) Foreign Application Priority Data
Sep. 10, 2020   (CN) .......................... 202010948477.8

(51) Int. Cl.
| G06V 30/146 | (2022.01) |
| G06T 5/00 | (2006.01) |
| G06V 30/12 | (2022.01) |
| G06V 30/10 | (2022.01) |
| G06V 10/22 | (2022.01) |

(52) U.S. Cl.
CPC .......... *G06V 30/1478* (2022.01); *G06T 5/006* (2013.01); *G06V 30/12* (2022.01); *G06V 10/22* (2022.01); *G06V 30/10* (2022.01)

(58) Field of Classification Search
CPC .... G06V 30/1478; G06V 30/10; G06V 30/12; G06V 10/22; G06T 5/006
See application file for complete search history.

(56) References Cited

U.S. PATENT DOCUMENTS

| 4,558,461 A | * | 12/1985 | Schlang | G06V 30/1478 |
| | | | | 382/296 |
| 2006/0039628 A1 | * | 2/2006 | Li | H04N 1/3873 |
| | | | | 382/289 |
| 2010/0014782 A1 | * | 1/2010 | Fero | G06V 10/243 |
| | | | | 382/290 |
| 2017/0177189 A1 | * | 6/2017 | Anvari | G06F 1/1686 |

FOREIGN PATENT DOCUMENTS

| CN | 105678296 A | * | 6/2016 | .......... G06K 9/3283 |
| JP | 2002207963 A | * | 7/2002 | |

* cited by examiner

*Primary Examiner* — Siamak Harandi
*Assistant Examiner* — Daniella M. DiGuglielmo
(74) *Attorney, Agent, or Firm* — IPro, PLLC (57) ABSTRACT

The present disclosure provides a method for correcting an OCR text position, a storage medium and an electronic device. The method includes: determining a first slope of each text block in an OCR recognition result of a to-be-processed image; fitting a tilt field function in accordance with the first slope of each text block; determining an offset value of each text block in accordance with the tilt field function; and correcting a position of each text block in accordance with the offset value.

14 Claims, 5 Drawing Sheets

METHOD FOR CORRECTING OPTICAL CHARACTER RECOGNITION TEXT POSITION, STORAGE MEDIUM AND ELECTRONIC DEVICE

CROSS-REFERENCE TO RELATED APPLICATION

This application claims a priority of the Chinese patent application No. 202010948477.8 field on Sep. 10, 2020, which is incorporated herein by reference in its entirety.

TECHNICAL FIELD

The present disclosure relates to the field of image processing and character recognition, in particular to a method for correcting an Optical Character Recognition (OCR) text position, a storage medium and an electronic device.

BACKGROUND

OCR refers to a procedure of detecting, by an electronic device, a character printed on paper, determining a shape of the character through detecting brightness, and translating the shape into computerized word using a character recognition method. The OCR now has a wide range of application.

SUMMARY

In one aspect, the present disclosure provides in some embodiments a method for correcting an OCR text position, including: determining a first slope of each text block in an OCR recognition result of a to-be-processed image; fitting a tilt field function in accordance with the first slope of each text block; determining an offset value of each text block in accordance with the tilt field function; and correcting a position of each text block in accordance with the offset value.

In a possible embodiment of the present disclosure, the determining the first slope of each text block in the OCR recognition result of the to-be-processed image includes: determining coordinates of vertices of each text block in the OCR recognition result; and determining the first slope of each text block and coordinates of a center of each text block in accordance with the coordinates of the vertices of each text block.

In a possible embodiment of the present disclosure, the determining the first slope of each text block and the coordinates of the center of each text block in accordance with the coordinates of the vertices of each text block includes: determining the first slope of each text block in accordance with the coordinates of the vertices of each text block through the following formula (1)

$$k'_1 = \frac{1}{2}\left(\frac{x_A - x_B}{y_A - y_B} + \frac{x_D - x_C}{y_D - y_C}\right); \quad (1)$$

and
determining the coordinates of the center of each text block in accordance with the coordinates of the vertices of each text block through the following formula (2)

$$O(x, y) = \left(\frac{x_A + x_B + x_C + x_D}{4}, \frac{y_A + y_B + y_C + y_D}{4}\right), \quad (2)$$

where the coordinates of the vertices of each text block are A $(x_A, y_A)$, B $(x_B, y_B)$, C $(x_C, y_C)$, and D $(x_D, y_D)$.

In a possible embodiment of the present disclosure, the fitting the tilt field function in accordance with the first slope of each text block includes: determining a second slope of each text block in accordance with the coordinates of the center of each text block and a cubic surface function, the cubic surface function being a cubic polynomial function of the coordinates of the center of any text block and being used to represent a tilt trend of the to-be-processed image; adjusting a parameter of the cubic surface function through a predetermined regression algorithm in accordance with the first slope and the second slope of each text block; and repeating the two steps, and determining a cubic surface function corresponding to the second slope as the tilt field function when a quadratic sum of differences between first slopes and second slopes of text blocks is minimum.

In a possible embodiment of the present disclosure, the differences between the first slopes and the second slopes of the text blocks are independent of each other and follow a normal distribution with a mean value of 0.

In a possible embodiment of the present disclosure, the predetermined regression algorithm at least includes a ridge regression algorithm.

In a possible embodiment of the present disclosure, the determining the offset value of each text block in accordance with the tilt field function includes performing discrete integration on the tilt field function at the coordinates of the center of each text block, and determining a discrete integration result as the offset value of each text block.

In a possible embodiment of the present disclosure, the coordinates of the center include two components, and the performing discrete integration on the tilt field function at the coordinates of the center of each text block and determining the integral result of the discrete integration as the offset value of each text block includes enabling a first component of the two components to be constant, and performing the discrete integration on the tilt field function at a second component of the coordinates of the centers of each text block, to acquire the offset value of each text block on the first component.

In another aspect, the present disclosure provides in some embodiments a device for correcting an OCR text position, including: a slope estimation module configured to determine a first slope of each text block in an OCR recognition result of a to-be-processed image; a fitting module configured to fit a tilt field function in accordance with the first slope of each text block; an offset calculation module configured to determine an offset value of each text block in accordance with the tilt field function; and a correction module configured to correct a position of each text block in accordance with the offset value.

In a possible embodiment of the present disclosure, the slope estimation module is specifically configured to: determine coordinates of vertices of each text block in the OCR recognition result; and determine the first slope of each text block and coordinates of a center of each text block in accordance with the coordinates of the vertices of each text block.

In a possible embodiment of the present disclosure, the fitting module is specifically configured to: determine a second slope of each text block in accordance with the coordinates of the center of each text block and a cubic surface function, the cubic surface function being a cubic polynomial function of the coordinates of the center of any text block and being used to represent a tilt trend of the to-be-processed image; adjust a parameter of the cubic surface function through a predetermined regression algorithm in accordance with the first slope and the second slope of each text block; and repeat the two steps, and determine a cubic surface function corresponding to the second slope as the tilt field function when a quadratic sum of differences between first slopes and second slopes of text blocks is minimum.

In a possible embodiment of the present disclosure, the offset calculation module is specifically configured to perform discrete integration on the tilt field function at the coordinates of the center of each text block, and determine a discrete integration result as the offset value of each text block.

In yet another aspect, the present disclosure provides in some embodiments a storage medium storing therein a computer program. The computer program is executed by a processor to implement the steps of the above-mentioned method.

In still yet another aspect, the present disclosure provides in some embodiments an electronic device including at least a memory, a processor and a computer program stored in the memory. The processor is configured to execute the computer program in the memory to implement the steps of the above-mentioned method.

In a possible embodiment of the present disclosure, the electronic device further includes an input device and/or an output device. The input device at least includes one of a camera, a scanner and a scanning pen, and the output device at least includes a display screen.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Various schemes and features in the present disclosure will be described hereinafter with reference to the drawings.

It should be appreciated that, various modifications may be made to the embodiments of the present disclosure. The following embodiments are for illustrative purposes only, but shall not be used to limit the scope of the present disclosure. Any other modifications may also be made by a person skilled in the art without departing from the scope and spirit of the present disclosure.

The drawings included in and constituting a part of the specification are for illustrative purposes only. These drawings and the embodiments are used together for explaining the principle of the present disclosure.

The other features of the present disclosure will become more apparent with reference to the drawings in conjunction with the non-restrictive embodiments.

It should be further appreciated that, although the description has been given with reference to some specific embodiments, many other equivalents may be determined by a person skilled in the art, and these equivalents have the features in the appended claims and fall within the scope defined by the appended claims.

The other aspects, features and advantages of the present disclosure will become more apparent with reference to the drawings in conjunction with the following description.

The specific embodiments will be described hereinafter with reference to the drawings. It should be appreciated that, the following embodiments are for illustrative purposes only, and they may be implemented in various ways. In addition, known and/or repeated functions and structures will not be described hereinafter in more details, so as to prevent the present disclosure from being confused due to unnecessary or superfluous details. Hence, the structural and functional details described hereinafter are not intended to define the scope of the present disclosure, but are merely used to enable a person skilled in the art to implement the present disclosure through substantially appropriate structures in a diverse manner.

Such expressions as "in a possible embodiment", "in another possible embodiment", "in yet another possible embodiment" and "in some other embodiments" involved herein are merely used to indicate one or more of same or different embodiments of the present disclosure.

Figure 1:
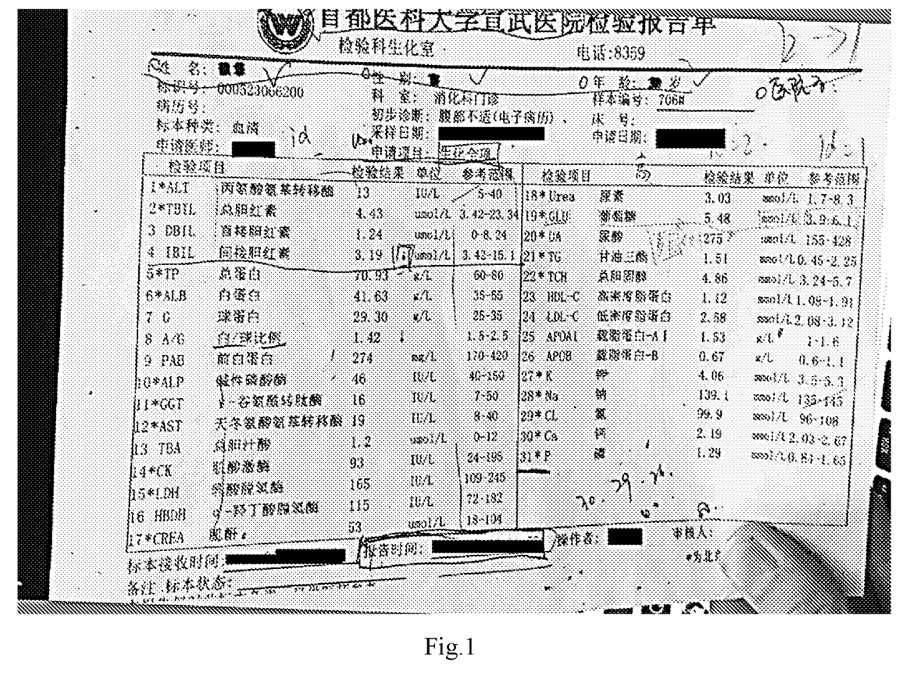
FIG. 1 is a schematic view showing a to-be-processed image according to one embodiment of the present disclosure.

For a user-oriented OCR application, in an OCR procedure of some receipts, usually various distortions occur for an image due to such factors as shooting skill, shooting angle and receipt storage state. For example, for common table data, the data in each row may probably include a plurality of text blocks. In the OCR procedure of the table data, especially in a scenario where a table does not include any borders, due to the distortions, the text blocks may be recognized as being in multiple rows, or the text blocks in a same row may be recognized as being in an adjacent row, so inconsistent content may occur and a great difficulty is brought to the subsequent analysis on the table. As shown in FIG. 1, when recognizing a medical report, the medical report is deformed because a lower right portion of the medical report is held by a user's hand. At this time, such a phenomenon as misplacement may occur for an OCR result due to the deformation of the medical report, and there may exist a mismatch among contents of test items, test results and reference ranges, so a recognition effect, even a subsequent diagnosis on a patient, may be seriously affected. In the related art, the above distortions are corrected through perspective transformation. However, in the case that a correction procedure is totally automatic, a success rate of correcting irregular deformation in FIG. 1 through the perspective transformation is low, and a correction effect is not ideal.

An object of the present disclosure is to provide a method and a device for correcting an OCR text position, a storage medium and an electronic device, so as to prevent the occurrence of misplacement due to a shooting error or deformation of paper.

Figure 2:
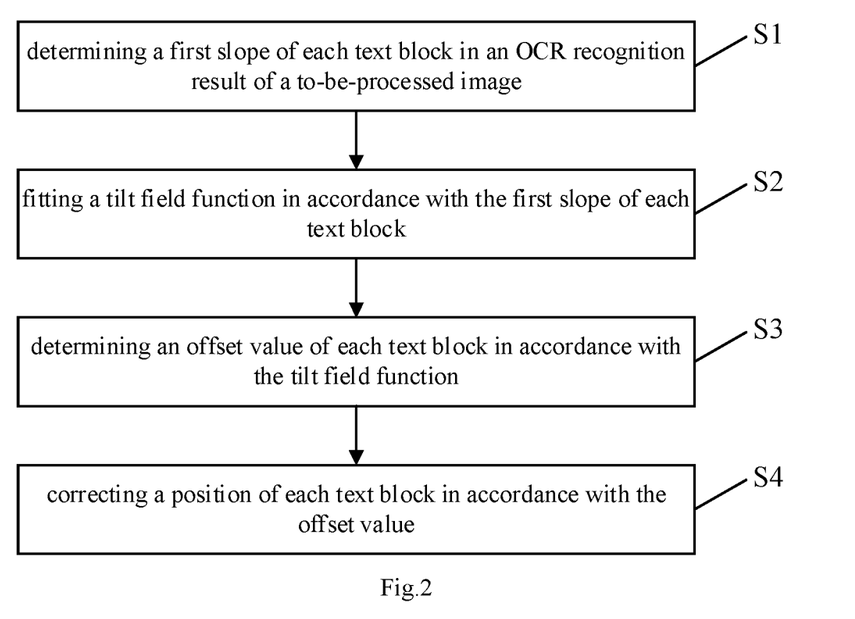
FIG. 2 is a flow chart of a method for correcting an OCR text position according to one embodiment of the present disclosure.

The present disclosure provides in some embodiments a method for correcting an OCR text position which, as shown in FIG. 2, mainly includes Steps S1 to S4.

S1: determining a first slope of each text block in an OCR recognition result of a to-be-processed image.

The to-be-processed image may be just an image on which the OCR is to be performed, and it may be an image acquired after processing a physical paper receipt through shooting, taking a screenshot or scanning. As shown in FIG. 1, a user may shoot a medical report using a mobile phone or camera, and a resultant image (i.e., that in FIG. 1) may be just the to-be-processed image.

OCR may be performed on the to-be-processed image through calling an OCR cloud service or using any other open-source OCR algorithm. A specific OCR algorithm will not be particularly defined herein, as long as a corresponding OCR recognition result of the to-be-processed image is capable of being outputted. To be specific, during the OCR, usually a text block serves as a minimum recognition unit. Generally, the text block includes words or phrases with semantic coherence, and an individual English word or a character string may also serve as a text block capable of being recognized through the OCR. For example, in FIG. 1, such contents as "检验项目 (test item)", "球蛋白 (globulin)" and "25-35" may each be recognized as an individual text block.

The OCR recognition result may be outputted in accordance with a size and a position of each text block. To be specific, when recognizing the to-be-processed image in FIG. 1, a tilt text block in FIG. 3 may occur in the recognition result due to the deformation when shooting the medical report, and the text block should be in a horizontal state when the medical report is flat. In the case that the medical report is tilted, misplacement may easily occur. At this time, a tilt level of each text block may be calculated in accordance with the OCR recognition result of the to-be-processed image, and it may be expressed as the first slope. To be specific, the OCR recognition result of the to-be-processed image may be outputted in the form of text blocks. When determining the first slope of each text block, a unique coordinate system may be established, coordinates of vertices of each text block in the current coordinate system may be determined in the recognition result, and then the tilt level of each text block may be estimated in accordance with the coordinates of the vertices of each text block. It should be appreciated that, a box surrounding the text block in FIG. 3 is used to show four vertices conveniently, and in an actual recognition result, this box does not exist.

Figure 3:
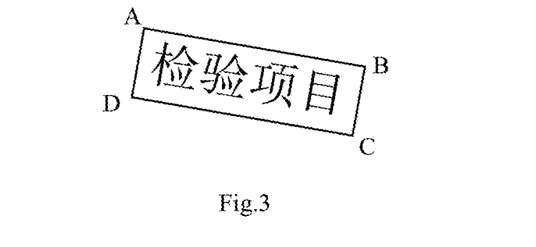
FIG. 3 is a schematic view showing a text block in a tilt state according to one embodiment of the present disclosure.

Taking the text block in FIG. 3 as an example, coordinates of the vertices of the text block may be A $(x_A, y_A)$, B $(x_B, y_B)$, C $(x_C, y_C)$, and D $(x_D, y_D)$ respectively, and a first slope $k'_1$ of the text block may be calculated through the following formula $$k'_1 = \frac{1}{2}\left(\frac{x_A - x_B}{y_A - y_B} + \frac{x_D - x_C}{y_D - y_C}\right). \quad (1)$$

Coordinates O (x, y) of a center of the text block may be further calculated in accordance with the coordinates of the vertices, i.e., $$O(x, y) = \left(\frac{x_A + x_B + x_C + x_D}{4}, \frac{y_A + y_B + y_C + y_D}{4}\right).$$

In actual use, usually the coordinates of the center (not shown in FIG. 3) of the text block is used to represent the text block. After acquiring the first slope, the first slope may also be taken as a slope of the center.

S2: fitting a tilt field function in accordance with the first slope of each text block.

In the embodiments of the present disclosure, for an original paper receipt, its variation trend (tilt level and twisting level) is continuous, so a tilt trend of each text block after the OCR should also change continuously. After calculating the first slope of each text block, the tilt field function may be fitted to represent the tilt trend of the to-be-processed image.

To be specific, in the embodiments of the present disclosure, it is presumed that a complexity level of the tilt trend of each text block does not exceed a cubic polynomial function, so the tilt field function may be fitted using a cubic surface function, i.e., $k(x, y)=a+bx+cy+dx^2+ey^2+fxy+gx^3+hy^3+ix^2y+jxy^2$ (2), where $k(x, y)$ represents a real slope of a point (x, y), i.e., a second slope, and a, b, c, d, e, f, g, h, i, j are parameters of the cubic surface function, i.e., the parameters to be adjusted through fitting. In a procedure of fitting the cubic surface function, at first the second slope of each text block may be determined in accordance with the coordinates of the center of each text block and the cubic surface function, i.e., horizontal and vertical coordinates of the center of each text block may be substituted into the above equation (2) to calculate the second slope. It should be appreciated that, in initial calculation, the parameters in equation (2) may be default values or random initial values, and then adjusted in a subsequent fitting process.

After acquiring the second slope calculated with respect to the coordinates of the center of each text block and the first slope of the text block, in the embodiments of the present disclosure, the cubic surface function may be fitted through a predetermined regression algorithm. In other words, after calculating the second slope each time, the parameters of the cubic surface function may be adjusted in accordance with a difference between the second slope and the first slope. In a possible embodiment of the present disclosure, a ridge regression algorithm may be used for fitting, so as to acquire the parameters of a generic type, thereby to optimize an effect of the function after the fitting.

In actual use, usually there is a certain offset for the coordinates of the text block acquired through the OCR algorithm, so the first slope may be an estimated value. In the embodiments of the present disclosure, it is presumed that differences ε between the real slopes (i.e., the second slopes) and the first slopes of the text blocks in the OCR recognition result are independent of each other and follow a normal distribution with a mean value of 0. In the fitting, after the parameters have been adjusted each time, the second slope of each text block may be calculated again in accordance with the coordinates of the center of each text block, and the difference between the second slope and the first slope may be calculated again. When a quadratic sum of the differences between the first slopes and the second slopes of the text blocks is minimum, the parameters corresponding to the second slope may be taken as actual parameters of the cubic surface function, and at this time, the determined cubic surface function may be the tilt field function.

In some embodiments of the present disclosure, the OCR recognition result usually includes a plurality of text blocks, and when determining the difference between the first slope and the second slope of each text block, a difference for one text block may not be minimum when a difference for another text block is minimum. Hence, a minimum difference may be determined through calculating an average value of the differences for all the text blocks.

Figure 4:
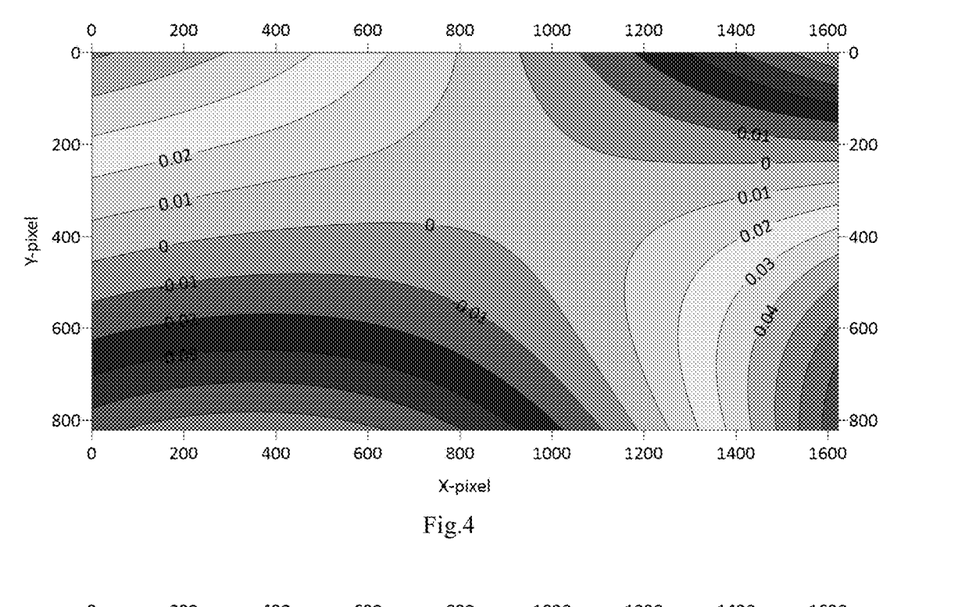
FIG. 4 is a schematic view showing a tilt field of the to-be-processed image according to one embodiment of the present disclosure.

FIG. 4 shows a tilt field corresponding to the to-be-processed image in FIG. 1. For example, a line with a numeric value 0.04 represents that a slope of each point on the line is 0.04. As shown in FIG. 4, four corner portions of the to-be-processed image in FIG. 1 are bent at different degrees, and the slope is relatively large especially in a y-axis direction, so such a phenomenon as misplacement may easily occur between the text blocks after the OCR.

S3: determining an offset value of each text block in accordance with the tilt field function.

In some embodiments of the present disclosure, the determining the offset value of each text block in accordance with the tilt field function may include performing discrete integration on the tilt field function at the coordinates of the center of each text block, and determining a discrete integration result as the offset value of each text block.

In some embodiments of the present disclosure, the coordinates of the center may include two components, and the performing discrete integration on the tilt field function at the coordinates of the center of each text block and determining the integral result of the discrete integration as the offset value of each text block may include enabling a first component of the two components to be constant, and performing the discrete integration on the tilt field function at a second component of the coordinates of the centers of each text block, to acquire the offset value of each text block on the first component.

Figure 5:
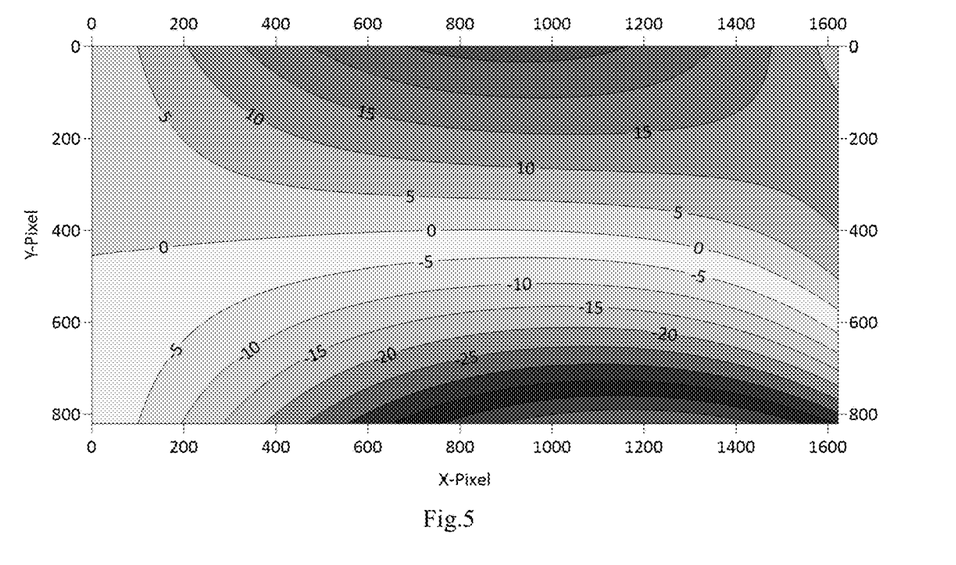
FIG. 5 is a schematic view showing a displacement field of the to-be-processed image according to one embodiment of the present disclosure.

In the embodiments of the present disclosure, the method mainly aims to adjust the misplacement, so when determining the offset value of each text block, the offset value of each text block in the y-axis direction may be determined principally. With respect to a point $(x_0, y_0)$, the integration may be performed on the tilt field function in an x-axis direction (i.e., maintaining a y-axis coordinate and performing the integration on an x-axis coordinate), so as to acquire a corresponding displacement field function $\int_0^{x_0} k(x, y_0)dx$ (3). Based on the displacement field function, a displacement field in FIG. 5 may be acquired in accordance with the tilt field in FIG. 4. As shown in FIG. 5, at this time, the text blocks are continuous in a better manner in the y-axis direction. For example, in FIG. 5, a line with a numeric value of 10 represents that each point on the line is offset by 10 pixels in the y-axis direction.

It should be appreciated that, equation (3) may be used to perform continuous integration on the tilt field function. In the embodiments of the present disclosure, the recognition result may be divided into parts with a text block as a minimum unit, and each text block may be represented by the coordinates of the center of the text block. Hence, during the integration, the discrete integration may be performed on the coordinates of the center of each text block in the x-axis direction, so as to further reduce a computational burden.

To be specific, for the point $(x_0, y_0)$, a corresponding offset value may be calculated through the following formula $$\Delta y(x_0, y_0) = \Sigma_0^{x_0} k(x, y_0) \quad (4),$$

where $\Delta y(x_0, y_0)$ represents the offset value of the point $(x_0, y_0)$.

S4: correcting a position of each text block in accordance with the offset value.

After S3, each text block in the recognition result may be provided with a unique offset value to represent a size of the center of the text block to be adjusted in the y-axis direction. During the correction, the offset value may be added to a vertical coordinate of the center of each text block, and a horizontal coordinate of the center may remain unchanged.

Figure 6:
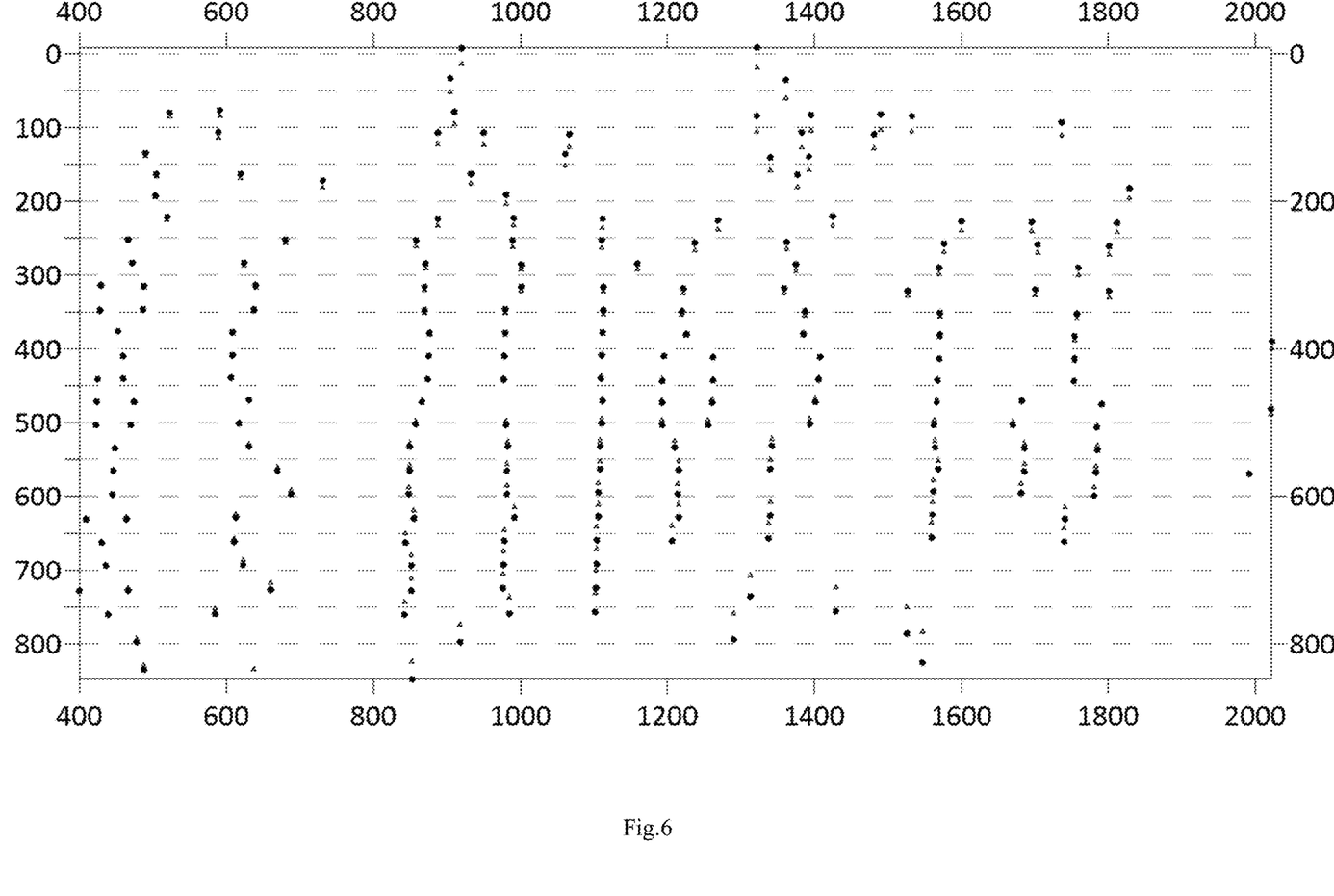
FIG. 6 is a comparison diagram of positions of text blocks in the to-be-processed image before and after correction according to one embodiment of the present disclosure.

FIG. 6 shows the comparison among positions of the centers of the text blocks after the medical report in FIG. 1 has been corrected. In FIG. 6, each dot represents a position after the correction, and each triangle represents a position before the correction. After comparison, the dots in FIG. 6 may be arranged in lines in a better manner, i.e., the text blocks after the correction maybe arranged in lines in a better manner. During the subsequent processing, it is able to achieve a better line reconstruction effect.

According to the embodiments of the present disclosure, surface fitting may be performed on the first slope of each text block in the OCR recognition result to form the tilt field function representing a change in the tilt trend for each text block, and then the offset value of each text block may be calculated in accordance with the tilt field function, and finally the position of each text block may be corrected in accordance with the offset value. As a result, it is able to accurately correct the misplacement for the text blocks in the OCR recognition result in a simple and convenient manner, thereby to improve the user experience.

It should be appreciated that, in the embodiments of the present disclosure, the misplacement in the y-axis direction may be mainly corrected. In actual use, when the misplacement in the x-axis direction needs to be corrected simultaneously, an offset value in the x-axis direction may also be calculated on the basis of a same principle, and then the horizontal coordinate of the center of the text block may be corrected in accordance with the offset value in the x-axis direction, which will not be particularly defined herein.

Figure 7:
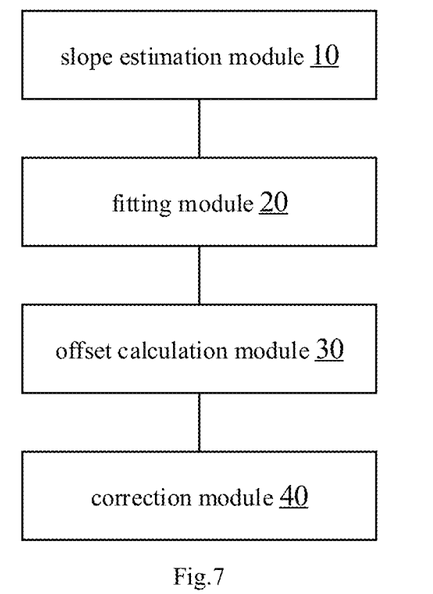
FIG. 7 is a structural view of a device for correcting an OCR text position according to one embodiment of the present disclosure.

The present disclosure further provides in some embodiments a device for correcting an OCR text position, which is mainly used to adjust a position of each text block in an OCR recognition result. As shown in FIG. 7, the device mainly includes a slope estimation module 10, a fitting module 20, an offset calculation module 30 and a correction module 40. The slope estimation module 10 is configured to determine a first slope of each text block in an OCR recognition result of a to-be-processed image. The fitting module 20 is coupled to the slope estimation module 10, and configured to fit a tilt field function in accordance with the first slope of each text block. The offset calculation module 30 is coupled to the fitting module 20, and configured to determine an offset value of each text block in accordance with the tilt field function. The correction module 40 is coupled to the offset calculation module 30, and configured to correct a position of each text block in accordance with the offset value.

The to-be-processed image may be just an image on which the OCR is to be performed, and it may be an image acquired after processing a physical paper receipt through shooting, taking a screenshot or scanning. OCR may be performed on the to-be-processed image through calling an OCR cloud service or using any other open-source OCR algorithm. A specific OCR algorithm will not be particularly defined herein, as long as a corresponding OCR recognition result of the to-be-processed image is capable of being outputted. For example, any OCR device may be directly used. To be specific, during the OCR, usually a text block serves as a minimum recognition unit. Generally, the text block includes words or phrases with semantic coherence, and an individual English word or a character string may also serve as a text block capable of being recognized through the OCR.

The OCR recognition result may be outputted by the OCR device in accordance with a size and a position of each text block. To be specific, when the to-be-processed image is recognized by the OCR device, a tilt text block in FIG. 3 may occur in the recognition result due to the deformation when shooting the medical report, and misplacement may easily occur. At this time, the slope estimation module 10 may calculate a tilt level of each text block in accordance with the OCR recognition result of the to-be-processed image, and the tilt level may be expressed as the first slope. To be specific, the OCR recognition result of the to-be-processed image may be outputted in the form of text blocks. When determining the first slope of each text block, the slope estimation module 10 may establish a unique coordinate system, determine coordinates of vertices of each text block in the current coordinate system in the recognition result, and then estimate the tilt level of each text block in accordance with the coordinates of the vertices of each text block Taking the text block in FIG. 3 as an example, coordinates of the vertices of the text block may be A $(x_A, y_A)$, B $(x_B, y_B)$, C $(x_C, y_C)$, and D $(x_D, y_D)$ respectively, and a first slope $k'_1$ of the text block may be calculated through the following formula $$k'_1 = \frac{1}{2}\left(\frac{x_A - x_B}{y_A - y_B} + \frac{x_D - x_C}{y_D - y_C}\right). \quad (1)$$

Coordinates O (x, y) of a center of the text block may be further calculated in accordance with the coordinates of the vertices, i.e., $$O(x, y) = \left(\frac{x_A + x_B + x_C + x_D}{4}, \frac{y_A + y_B + y_C + y_D}{4}\right).$$

In actual use, usually the coordinates of the center (not shown in FIG. 3) of the text block is used to represent the text block. After acquiring the first slope, the first slope may also be taken as a slope of the center.

For an original paper receipt, its variation trend (tilt level and twisting level) is continuous, so a tilt trend of each text block after the OCR should also change continuously. After calculating the first slope of each text block, the tilt field function may be fitted to represent the tilt trend of the to-be-processed image.

To be specific, in the embodiments of the present disclosure, it is presumed that a complexity level of the tilt trend of each text block does not exceed a cubic polynomial function, so the tilt field function may be fitted using a cubic surface function, i.e., $k(x, y)=a+bx+cy+dx^2+ey^2+fxy+gx^3+hy^3+ix^2y+jxy^2$ (2), where k(x, y) represents a real slope of a point (x, y), i.e., a second slope, and a, b, c, d, e, f, g, h, i, j are parameters of the cubic surface function, i.e., the parameters to be adjusted through fitting. In a procedure of fitting the cubic surface function, at first the fitting module 20 may determine the second slope of each text block in accordance with the coordinates of the center of each text block and the cubic surface function, i.e., horizontal and vertical coordinates of the center of each text block may be substituted into the above equation (2) to calculate the second slope. It should be appreciated that, when the fitting module 20 performs initial calculation, the parameters in equation (2) may be default values or random initial values, and then adjusted in a subsequent fitting process.

After acquiring the second slope calculated with respect to the coordinates of the center of each text block and the first slope of the text block, in the embodiments of the present disclosure, the cubic surface function may be fitted through a predetermined regression algorithm. In other words, after calculating the second slope each time, the parameters of the cubic surface function may be adjusted in accordance with a difference between the second slope and the first slope. In a possible embodiment of the present disclosure, a ridge regression algorithm may be used for fitting, so as to acquire the parameters of a generic type, thereby to optimize an effect of the function after the fitting.

In actual use, usually there is a certain offset for the coordinates of the text block acquired through the OCR algorithm, so the first slope may be an estimated value. In the embodiments of the present disclosure, it is presumed that differences £ between the real slopes (i.e., the second slopes) and the first slopes of the text blocks in the OCR recognition result are independent of each other and follow a normal distribution with a mean value of 0. In the fitting, after the parameters have been adjusted each time, the fitting module 20 may calculate the second slope of each text block again in accordance with the coordinates of the center of each text block, and calculate the difference between the second slope and the first slope again. When a quadratic sum of the differences between the first slopes and the second slopes of the text blocks is minimum, the parameters corresponding to the second slope may be taken as actual parameters of the cubic surface function, and at this time, the determined cubic surface function may be the tilt field function.

In some embodiments of the present disclosure, the OCR recognition result usually includes a plurality of text blocks, and when determining the difference between the first slope and the second slope of each text block, a difference for one text block may not be minimum when a difference for another text block is minimum. Hence, a minimum difference may be determined through calculating an average value of the differences for all the text blocks.

In the embodiments of the present disclosure, the method mainly aims to adjust the misplacement, so when determining the offset value of each text block, the offset value of each text block in the y-axis direction may be determined by the offset calculation module 30 principally. With respect to a point $(x_0, y_0)$, the integration may be performed on the tilt field function in an x-axis direction (i.e., maintaining a y-axis coordinate and performing the integration on an x-axis coordinate), so as to acquire a corresponding displacement field function $\int_0^{x_0} k(x, y_0)dx$ (3).

It should be appreciated that, equation (3) may be used to perform continuous integration on the tilt field function. In the embodiments of the present disclosure, the recognition result may be divided into parts with a text block as a minimum unit, and each text block may be represented by the coordinates of the center of the text block. Hence, during the integration, the discrete integration may be performed on the coordinates of the center of each text block in the x-axis direction, so as to further reduce a computational burden. To be specific, for the point $(x_0, y_0)$, a corresponding offset value may be calculated through the following formula $$\Delta y(x_0, y_0) = \Sigma_0^{x_0} k(x, y^0) \quad (4),$$

where $\Delta y(x_0, y_0)$ represents the offset value of the point $(x_0, y_0)$.

After the offset calculation module 30 has determined the offset value corresponding to each text block, each text block in the recognition result may be provided with a unique offset value to represent a size of the center of the text block to be adjusted in the y-axis direction. During the correction, the correction module 40 may add the offset value to a vertical coordinate of the center of each text block, and a horizontal coordinate of the center may remain unchanged.

According to the embodiments of the present disclosure, surface fitting may be performed on the first slope of each text block in the OCR recognition result to form the tilt field function representing a change in the tilt trend for each text block, and then the offset value of each text block may be calculated in accordance with the tilt field function, and finally the position of each text block may be corrected in accordance with the offset value. As a result, it is able to accurately correct the misplacement for the text blocks in the OCR recognition result in a simple and convenient manner, thereby to improve the user experience.

It should be appreciated that, in the embodiments of the present disclosure, the misplacement in the y-axis direction may be mainly corrected. In actual use, when the misplacement in the x-axis direction needs to be corrected simultaneously, an offset value in the x-axis direction may also be calculated on the basis of a same principle, and then the horizontal coordinate of the center of the text block may be corrected in accordance with the offset value in the x-axis direction, which will not be particularly defined herein.

The present disclosure further provides in some embodiments a storage medium, e.g., a computer-readable storage medium storing therein a computer program. The computer program is executed by a processor to implement the above-mentioned method. To be specific, the computer program is executed by the processor to implement: S31 of determining a first slope of each text block in an OCR recognition result of a to-be-processed image; S32 of fitting a tilt field function in accordance with the first slope of each text block; S33 of determining an offset value of each text block in accordance with the tilt field function; and S34 of correcting a position of each text block in accordance with the offset value.

When determining the first slope of each text block in the OCR recognition result of the to-be-processed image, the computer program is further executed by the processor to: determine coordinates of vertices of each text block in the OCR recognition result; and determine the first slope of each text block and coordinates of a center of each text block in accordance with the coordinates of the vertices of each text block.

In some embodiments of the present disclosure, the computer program is further executed by the processor to: determine the first slope of each text block in accordance with the coordinates of the vertices of each text block through the following formula (1)

$$k_1' = \frac{1}{2}\left(\frac{x_A - x_B}{y_A - y_B} + \frac{x_D - x_C}{y_D - y_C}\right); \quad (1)$$

and
determine the coordinates of the center of each text block in accordance with the coordinates of the vertices of each text block through the following formula (2)

$$O(x, y) = \left(\frac{x_A + x_B + x_C + x_D}{4}, \frac{y_A + y_B + y_C + y_D}{4}\right), \quad (2)$$

where the coordinates of the vertices of each text block are A $(x_A, y_A)$, B $(x_B, y_B)$, C $(x_C, y_C)$, and D $(x_D, y_D)$.

When fitting the tilt field function in accordance with the first slope of each text block, the computer program is further executed by the processor to: determine a second slope of each text block in accordance with the coordinates of the center of each text block and a cubic surface function, the cubic surface function being a cubic polynomial function of the coordinates of the center of any text block and being used to represent a tilt trend of the to-be-processed image; adjust a parameter of the cubic surface function through a predetermined regression algorithm in accordance with the first slope and the second slope of each text block; and repeat the two steps, and determine a cubic surface function corresponding to the second slope as the tilt field function when a quadratic sum of differences between first slopes and second slopes of text blocks is minimum.

In some embodiments of the present disclosure, the differences between the first slopes and the second slopes of the text blocks may be independent of each other and follow a normal distribution with a mean value of 0.

In some embodiments of the present disclosure, the predetermined regression algorithm may at least include a ridge regression algorithm.

When determining the offset value of each text block in accordance with the tilt field function, the computer program is further executed by the processor to perform discrete integration on the tilt field function at the coordinates of the center of each text block, and determine a discrete integration result as the offset value of each text block.

In some embodiments of the present disclosure, the computer program is further executed by the processor to enable a first component in two components of the coordinates of the center to be constant, and perform the discrete integration on the tilt field function at a second component of the coordinates of the centers of each text block, to acquire the offset value of each text block on the first component.

According to the embodiments of the present disclosure, surface fitting may be performed on the first slope of each text block in the OCR recognition result to form the tilt field function representing a change in the tilt trend for each text block, and then the offset value of each text block may be calculated in accordance with the tilt field function, and finally the position of each text block may be corrected in accordance with the offset value. As a result, it is able to accurately correct the misplacement for the text blocks in the OCR recognition result in a simple and convenient manner, thereby to improve the user experience.

Figure 8:
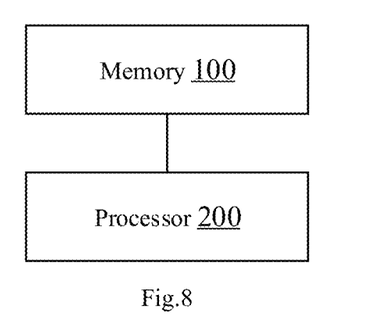
FIG. 8 is a structural view of an electronic device according to one embodiment of the present disclosure.
Figure 9:
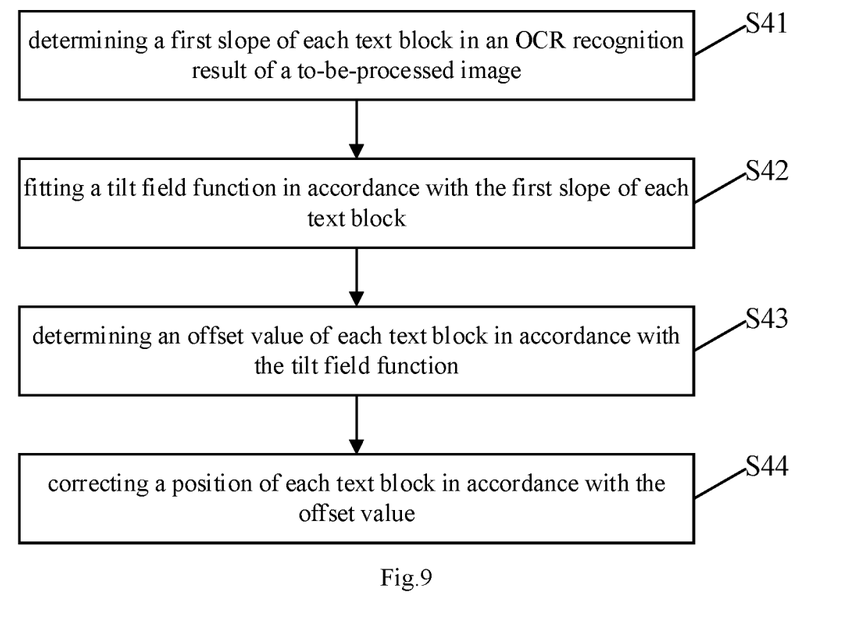
FIG. 9 is a flow chart of the electronic device executing the method for correcting the OCR text position according to one embodiment of the present disclosure.

The present disclosure further provides in some embodiments an electronic device which, as shown in FIG. 8, at least includes a memory 100 and a processor 200. To be specific, a computer program is stored in the memory 100. The processor 200 is configured to execute the computer program in the memory 100, so as to implement: S41 of determining a first slope of each text block in an OCR recognition result of a to-be-processed image; S42 of fitting a tilt field function in accordance with the first slope of each text block; S43 of determining an offset value of each text block in accordance with the tilt field function; and S44 of correcting a position of each text block in accordance with the offset value.

When determining the first slope of each text block in the OCR recognition result of the to-be-processed image, the processor 200 is further configured to execute the computer program in the memory 100 so as to: determine coordinates of vertices of each text block in the OCR recognition result; and determine the first slope of each text block and coordinates of a center of each text block in accordance with the coordinates of the vertices of each text block.

To be specific, in actual use, before correction, the OCR recognition result may be displayed on a display screen of the electronic device for user's viewing. In the case that a user determines that there is serious misplacement in the recognition result, the user may touch a button to send a correction instruction. Upon the receipt of the correction instruction, the electronic device may perform a subsequent correction operation.

When fitting the tilt field function in accordance with the first slope of each text block, the processor 200 is further configured to execute the computer program in the memory 100 so as to: determine a second slope of each text block in accordance with the coordinates of the center of each text block and a cubic surface function, the cubic surface function being a cubic polynomial function of the coordinates of the center of any text block and being used to represent a tilt trend of the to-be-processed image; adjust a parameter of the cubic surface function through a predetermined regression algorithm in accordance with the first slope and the second slope of each text block; and repeat the two steps, and determine a cubic surface function corresponding to the second slope as the tilt field function when a quadratic sum of differences between first slopes and second slopes of text blocks is minimum.

In some embodiments of the present disclosure, the differences between the first slopes and the second slopes of the text blocks may be independent of each other and follow a normal distribution with a mean value of 0.

In some embodiments of the present disclosure, the predetermined regression algorithm may at least include a ridge regression algorithm.

When determining the offset value of each text block in accordance with the tilt field function, the processor 200 is further configured to execute the computer program in the memory 100 so as to perform discrete integration on the tilt field function at the coordinates of the center of each text block, and determine a discrete integration result as the offset value of each text block.

In some embodiments of the present disclosure, the processor 200 is further configured to execute the computer program in the memory 100 so as to enable a first component in two components of the coordinates of the center to be constant, and perform the discrete integration on the tilt field function at a second component of the coordinates of the centers of each text block, to acquire the offset value of each text block on the first component.

To be specific, in actual use, a comparison result showing positions before the correction and after the correction may be displayed on the display screen of the electronic device for the user.

Further, in order to improve the user experience, the electronic device in the embodiments of the present disclosure may be any electronic processing device having a processing function, e.g., a mobile phone, a tablet computer or a computer server. The electronic device may also be used in combination with any OCR device, so as to acquire the OCR recognition result of the to-be-processed image from the OCR device. Alternatively, the electronic device may be provided with an OCR unit, so that the electronic device itself is provided with an ORC capability.

To be specific, the electronic device may also be equipped with an input device and/or an output device. The input device may be the OCR device or a computer having an OCR function, and it is configured to input the OCR recognition result of the to-be-processed image to the electronic device. The input device may also be a camera, a scanner, a scanning pen or the like in the electronic device or coupled to the electronic device. The electronic device may collect the to-be-processed image through the input device. When the electronic device has the OCR function, it may directly output the OCR recognition result in accordance with the image collected by the input device. Correspondingly, the computer program for implementing an OCR algorithm may be stored in the memory 100. Prior to executing the computer program for S41, the processor 200 may execute the computer program corresponding to the OCR algorithm in accordance with the to-be-processed image from the input device, and then perform the subsequent processing steps after acquiring the OCR recognition result of the to-be-processed image.

In the embodiments of the present disclosure, the output device mainly refers to a display screen having a display function, and it may be a screen of the electronic device itself (e.g., a screen of a mobile phone or a computer), or it may be an external display or projector coupled to the electronic device in a wired or wireless manner. The output device is mainly used to display a result acquired after each step is executed by the processor 200, e.g., display the OCR recognition result of the to-be-processed image, a position of each text block before the correction, a position of each text block after the correction, or a tilt field or a displacement field used in the processing, so as to help the user to acquire a correction situation in real time and perform manual intervention in time when issues arise.

According to the embodiments of the present disclosure, surface fitting may be performed on the first slope of each text block in the OCR recognition result to form the tilt field function representing a change in the tilt trend for each text block, and then the offset value of each text block may be calculated in accordance with the tilt field function, and finally the position of each text block may be corrected in accordance with the offset value. As a result, it is able to accurately correct the misplacement for the text blocks in the OCR recognition result in a simple and convenient manner, thereby to improve the user experience.

The above embodiments are for illustrative purposes only, but the present disclosure is not limited thereto. Obviously, a person skilled in the art may make further modifications and improvements on the basis of the concept of the present disclosure, and these modifications and improvements shall also fall within the scope of the present disclosure.

What is claimed is:

1. A method for correcting an Optical Character Recognition (OCR) text position, comprising:
   determining a first slope of each text block in an OCR recognition result of a to-be-processed image;
   fitting a tilt field function in accordance with the first slope of each text block;
   determining an offset value of each text block in accordance with the tilt field function; and
   correcting the text position of each text block in accordance with the offset value;
   wherein the determining the first slope of each text block in the OCR recognition result of the to-be-processed image comprises:

determining coordinates of vertices of each text block in the OCR recognition result; and determining the first slope of each text block and coordinates of a center of each text block in accordance with the coordinates of the vertices of each text block; and the determining the offset value of each text block in accordance with the tilt field function comprises performing discrete integration on the tilt field function at the coordinates of the center of each text block, and determining a discrete integration result as the offset value of each text block.

2. The method according to claim 1, wherein the determining the first slope of each text block and the coordinates of the center of each text block in accordance with the coordinates of the vertices of each text block comprises:

determining the first slope of each text block in accordance with the coordinates of the vertices of each text block through the following formula (1)

$$k_1' = \frac{1}{2}\left(\frac{x_A - x_B}{y_A - y_B} + \frac{x_D - x_C}{y_D - y_C}\right); \quad (1)$$

and determining the coordinates of the center of each text block in accordance with the coordinates of the vertices of each text block through the following formula (2)

$$O(x, y) = \left(\frac{x_A + x_B + x_C + x_D}{4}, \frac{y_A + y_B + y_C + y_D}{4}\right), \quad (2)$$

where the coordinates of the vertices of each text block are A $(x_A, y_A)$, B $(x_B, y_B)$, C $(x_C, y_C)$, and D $(x_D, y_D)$.

3. The method according to claim 2, wherein the fitting the tilt field function in accordance with the first slope of each text block comprises:

determining a second slope of each text block in accordance with the coordinates of the center of each text block and a cubic surface function, the cubic surface function being a cubic polynomial function of the coordinates of the center of any text block and being used to represent a tilt trend of the to-be-processed image;

adjusting a parameter of the cubic surface function through a predetermined regression algorithm in accordance with the first slope and the second slope of each text block; and repeating the above two steps of determining the second slope of each text block in accordance with the coordinates of the center of each text block and the cubic surface function and adjusting the parameter of the cubic surface function through the predetermined regression algorithm in accordance with the first slope and the second slope of each text block, and determining the cubic surface function corresponding to the second slope as the tilt field function when a quadratic sum of differences between first slopes and second slopes of text blocks is minimum.

4. The method according to claim 3, wherein the differences between the first slopes and the second slopes of the text blocks are independent of each other and follow a normal distribution with a mean value of 0.

5. The method according to claim 4, wherein the predetermined regression algorithm at least comprises a ridge regression algorithm.

6. The method according to claim 1, wherein the coordinates of the center comprise two components, and the performing discrete integration on the tilt field function at the coordinates of the center of each text block and determining the discrete integration result as the offset value of each text block comprises enabling a first component of the two components to be constant, and performing the discrete integration on the tilt field function at a second component of the coordinates of the centers of each text block, to acquire the offset value of each text block on the first component.

7. An electronic device, at least comprising a memory and a processor, wherein a computer program is stored in the memory, and the processor is configured to execute the computer program in the memory to implement the method according to claim 1.

8. The electronic device according to claim 7, further comprising an input device and/or an output device, wherein the input device at least comprises one of a camera, a scanner and a scanning pen, and the output device at least comprises a display screen.

9. A non-transitory storage medium storing therein a computer program, wherein the computer program is executed by a processor to:

determine a first slope of each text block in an OCR recognition result of a to-be-processed image;

fit a tilt field function in accordance with the first slope of each text block;

determine an offset value of each text block in accordance with the tilt field function; and correct a position of each text block in accordance with the offset value;

wherein the computer program is further executed by the processor to:

determine coordinates of vertices of each text block in the OCR recognition result; and determine the first slope of each text block and coordinates of a center of each text block in accordance with the coordinates of the vertices of each text block; and wherein the computer program is further executed by the processor to perform discrete integration on the tilt field function at the coordinates of the center of each text block, and determine a discrete integration result as the offset value of each text block.

10. The non-transitory storage medium according to claim 9, wherein the computer program is further executed by the processor to:

determine the first slope of each text block in accordance with the coordinates of the vertices of each text block through the following formula (1)

$$k_1' = \frac{1}{2}\left(\frac{x_A - x_B}{y_A - y_B} + \frac{x_D - x_C}{y_D - y_C}\right); \quad (1)$$

and determine the coordinates of the center of each text block in accordance with the coordinates of the vertices of each text block through the following formula (2)

$$O(x, y) = \left(\frac{x_A + x_B + x_C + x_D}{4}, \frac{y_A + y_B + y_C + y_D}{4}\right), \quad (2)$$

where the coordinates of the vertices of each text block are A $(x_A, y_A)$, B $(x_B, y_B)$, C $(x_C, y_C)$, and D $(x_D, y_D)$.

11. The non-transitory storage medium according to claim 10, wherein the computer program is further executed by the processor to:
- determine a second slope of each text block in accordance with the coordinates of the center of each text block and a cubic surface function, the cubic surface function being a cubic polynomial function of the coordinates of the center of any text block and being used to represent a tilt trend of the to-be-processed image;
- adjust a parameter of the cubic surface function through a predetermined regression algorithm in accordance with the first slope and the second slope of each text block; and
- repeat the above two steps of determining the second slope of each text block in accordance with the coordinates of the center of each text block and the cubic surface function and adjusting the parameter of the cubic surface function through the predetermined regression algorithm in accordance with the first slope and the second slope of each text block, and determine the cubic surface function corresponding to the second slope as the tilt field function when a quadratic sum of differences between first slopes and second slopes of text blocks is minimum.

12. The non-transitory storage medium according to claim 11, wherein the differences between the first slopes and the second slopes of the text blocks are independent of each other and follow a normal distribution with a mean value of O.

13. The non-transitory storage medium according to claim 12, wherein the predetermined regression algorithm at least comprises a ridge regression algorithm.

14. The non-transitory storage medium according to claim 9, wherein the computer program is further executed by the processor to enable a first component of two components of the coordinates of the center to be constant, and perform the discrete integration on the tilt field function at a second component of the coordinates of the centers of each text block, to acquire the offset value of each text block on the first component.

* * * * *